(12) United States Patent
Huang

(10) Patent No.: US 12,710,786 B2
(45) Date of Patent: Aug. 18, 2026

(54) ELECTRONIC DEVICE

(71) Applicant: Lenovo (Beijing) Limited, Beijing (CN)

(72) Inventor: Lei Huang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 76 days.

(21) Appl. No.: 18/821,292

(22) Filed: Aug. 30, 2024

(65) Prior Publication Data

US 2025/0076919 A1 Mar. 6, 2025

(30) Foreign Application Priority Data

Sep. 1, 2023 (CN) ........................ 202311126520.2

(51) Int. Cl.
*G06F 1/16* (2006.01)
*F16M 11/04* (2006.01)
*F16M 11/08* (2006.01)

(52) U.S. Cl.
CPC ......... *G06F 1/1601* (2013.01); *F16M 11/045* (2013.01); *F16M 11/046* (2013.01); *F16M 11/08* (2013.01); *F16M 2200/02* (2013.01)

(58) Field of Classification Search
CPC .. G06F 1/1601; F16M 11/045; F16M 11/046; F16M 11/08
USPC ...................................................... 248/122.1
See application file for complete search history.

(56) References Cited

U.S. PATENT DOCUMENTS

| | | | | |
|---|---|---|---|---|
| 7,529,083 | B2 * | 5/2009 | Jeong | F16M 11/105 600/407 |
| 7,878,476 | B2 * | 2/2011 | Carson | F16M 13/02 248/920 |
| 9,523,461 | B2 * | 12/2016 | Kuan | F16M 11/10 |
| 10,463,147 | B2 * | 11/2019 | Bowman | F16M 13/02 |
| 2024/0324119 | A1 * | 9/2024 | Ma | G06F 1/1607 |

* cited by examiner

*Primary Examiner* — Todd M Epps
(74) *Attorney, Agent, or Firm* — ANOVA LAW GROUP, PLLC

(57) ABSTRACT

An electronic device that includes a first body, a second body and a connecting assembly, the connecting assembly including a first structural assembly movably connected to the first body and a second structural assembly movably connected to the second body. The electronic device is configured to switch to different device forms through a first relative movement between the first body and the first structural assembly and/or a second relative movement between the second body and the second structural assembly, and in different device forms. The relative position between the first structural assembly and the second structural assembly is different or the same.

18 Claims, 17 Drawing Sheets

ELECTRONIC DEVICE

CROSS-REFERENCES TO RELATED APPLICATION

This application claims priority to Chinese Patent Application No. 202311126520.2 filed on Sep. 1, 2023, the entire content of which is incorporated herein by reference.

FIELD OF TECHNOLOGY

The present disclosure relates to the technical field of electronic equipment and, more specifically, to an electronic device.

BACKGROUND

When people use electronic devices such as desktop computers, they often expand and connect displays to meet the demand for a large display area. However, the current method of simply connecting two independent displays together has the disadvantage of a single device form, which cannot meet users' diverse needs. There is a need to improve the electronic devices to meet people's diverse usage needs.

SUMMARY

One aspect of this disclosure provides an electronic device. The electronic device includes a first body, a second body and a connecting assembly. The connecting assembly includes a first structural assembly movably connected to the first body and a second structural assembly movably connected to the second body. The electronic device is configured to switch to different device forms through a first relative movement between the first body and the first structural assembly and/or a second relative movement between the second body and the second structural assembly, and in different device forms. The relative position between the first structural assembly and the second structural assembly is different or the same.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

Figure 1:
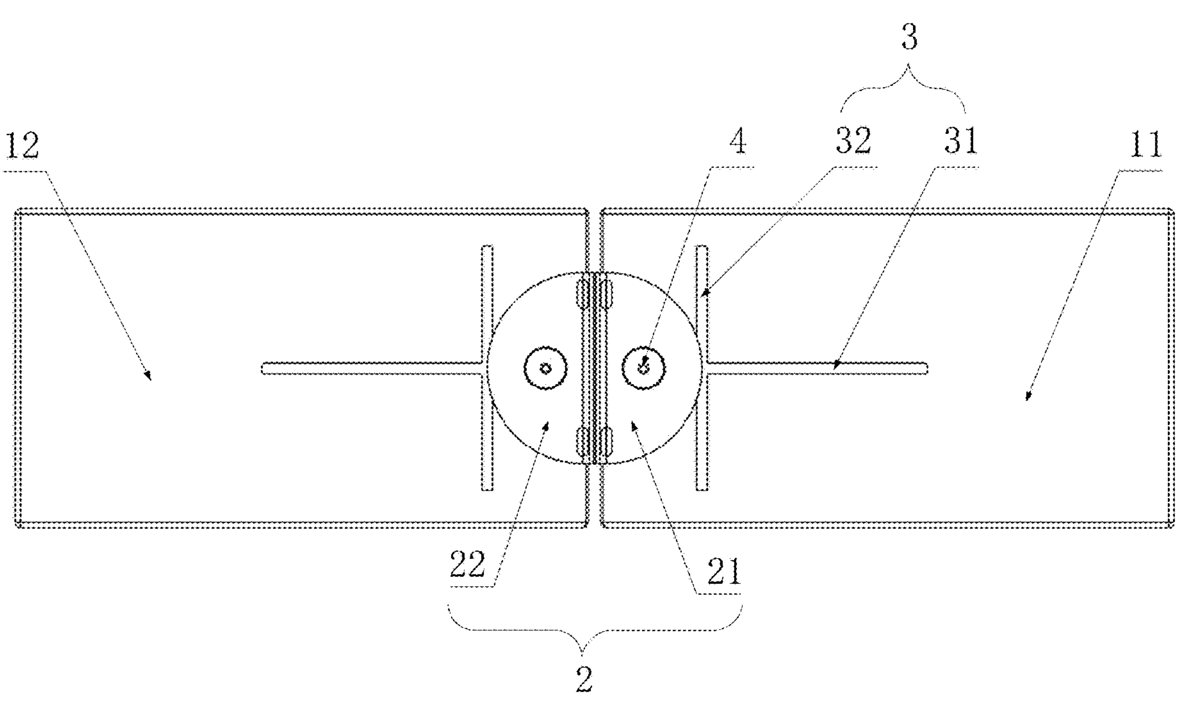
FIG. 1 is a schematic diagram of an electronic device according to an embodiment of the present disclosure.

Reference numerals in the drawings include 11. First Body; 12. Second Body; 2. Connecting assembly; 21. First Structural Assembly; 22. Second Structural Assembly; 3. First Hole Structure; 31: First Straight Groove; 32. Second Straight Groove; 4. First Unlocking Button; 5. Ball; 6. First Fastener; 7: First Locking Member; 8 Support Column; 9. Base; 111. Target Functional Member; 112. First Plate; 211. Third Plate; 212. Second Plate; 231. First Shaft; 232. First Connecting Structure; and 233. First Connecting Member.

DETAILED DESCRIPTION

The present disclosure provides an electronic device that can meet the user's diverse usage needs for device forms.

The technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Referring to FIG. 1 to FIG. 20, an embodiment of the present disclosure provides an electronic device. The electronic device includes a first body 11, a second body 12, and a connecting assembly 2. The connecting assembly 2 includes a first structural assembly 21 movably connected to the first body 11, and a second structural assembly 22 movably connected to the second body 12. The electronic device can have different device forms through a first relative movement between the first body 11 and the first structural assembly 21 and/or a second relative movement between the second body 12 and the second structural assembly 22. In different device forms, the relative positions of the first structural assembly 21 and the second structural assembly 22 can be different or the same. The first body 11 and the second body 12 can be configured into various types. For example, the first body 11 and the second body 12 may both be configured as displays or tablet computers, or one of the first body 11 and the second body 12 may be configured as a display and the other may be configured as a tablet host. For convenience, FIG. 1 exemplarily illustrates the first body 11 and the second body 12 as displays. It should be understood that the first body 11 and/or the second body 12 may also be configured as other types such as a speaker as required. The first body 11 and the second body 12 are connected together by a connecting assembly 2, and the connecting assembly 2 includes a first structural assembly 21 and a second structural assembly 22. The first structural assembly 21 can be movably connected to the first body 11, and the second structural assembly 22 can be movably connected to the second body 12. That is, the first body 11 can move relative to the first structural assembly 21, and the second body 12 can move relative to the second structural assembly 22. When the user wants to switch the device form of the electronic device, it can be realized by moving the first body 11 relative to the first structural assembly 21, or by moving the second body 12 relative to the second structural assembly 22, or by moving the first body 11 and the second body 12 relative to the first structural assembly 21 and the second structural assembly 22, respectively. The relative position between the first structural assembly 21 and the second structural assembly 22 may include the orientation and spacing between the first structural assembly 21 and the second structural assembly 22, and then angle between the planes where the first structural assembly 21 and the second structural assembly 22 are located, etc. when at least one of the orientation and spacing changes, it may indicate that the relative position between the first structural assembly 21 and the second structural assembly 22 changed.

In some embodiments, the relative position between the first structural assembly 21 and the second structural assembly 22 may change with the relative movement between the first body 11 and the second body 12. That is, when the user switches certain device forms of the device form, the first structural assembly 21 and the second structural assembly 22 can move relative to each other to change the relative position between the two. It should be understood that the above example also allows the relative position between the first structural assembly 21 and the second structural assembly 22 to remain unchanged when the user switches to other device forms of the electronic device. This example does not limit the relative position to change every time the device form is switched. For example, when the electronic device switches from the device form shown in FIG. 1 to the device form shown in FIG. 3, the first body 11 and the second body 12 are displaced relative to each other along the up-down direction (i.e., the vertical direction) in FIG. 1, and the relative position between the first structural assembly 21 and the second structural assembly 22 changes during this process. When the electronic device switches from the device form shown in FIG. 3 to the device form shown in FIG. 4, the first body 11 and the second body 12 are displaced relative to each other along the horizontal direction in FIG. 3, and the relative position between the first structural assembly 21 and the second structural assembly 22 does not change during this process.

More specifically, the type of relative movement between the first structural assembly 21 and the second structural assembly 22 (hereinafter referred to as "third relative movement" for convenience) may be the same as the type of relative movement between the first body 11 and the second body 12, or may be different. For example, in some embodiments, the type of movement between the first body 11 and the second body 12 may include sliding (e.g., from the device form shown in FIG. 1 to the device form shown in FIG. 3, and then to the device form shown in FIG. 4), rotation (e.g., from the device form shown in FIG. 5 to the device form shown in FIG. 6, and from the device form shown in FIG. 10 to the device form shown in FIG. 11), and flipping (e.g., from the device form shown in FIG. 12 to the device form shown in FIG. 13). The third relative movement may include sliding and flipping. In other embodiments, the movement types between the first body 11 and the second body 12 may only include sliding and flipping to realize the same type of relative movement as the third relative movement described above, except that the device form that the electronic device can realize is relatively less than of this embodiment. In addition, in a specific switching process of the device form, the type of the third relative movement may be the same as or different from the type of relative movement between the first body 11 and the second body 12. For example, during the switching process from the device form shown in FIG. 1 to the device form shown in FIG. 3, the first body 11 slides relative to the second body 12, and the first structural assembly 21 also slides relative to the second structural assembly 22. During the switching process from the device form shown in FIG. 5 to the device form shown in FIG. 7, the first body 11 slides and rotates relative to the second body 12, and the first structural assembly 21 only slides relative to the second structural assembly 22.

Similarly, the type of the third relative movement may be the same as or different from the type of the first relative movement. For example, in some embodiments, the type of first relative movement, that is, the movement type between the first body 11 and the first structural assembly 21 may include sliding (e.g., from the device form shown in FIG. 3 to the device form shown in FIG. 4) and rotating (e.g., from the device form shown in FIG. 5 to the device form shown in FIG. 6). The third relative movement may include sliding and flipping. In other embodiments, based on this embodiment, the first relative movement type may further include flipping, and the third relative movement type may further include rotation. In this way, the type of first relative movement is the same as the type of the third relative movement, that is, both movement types include sliding, rotating, and flipping. That is, when setting the relative movement relationship, the first relative movement and the third relative movement can refer to each other. Similarly, the type of third relative movement may be the same as or different from the type of second relative movement.

In some embodiments, the connecting assembly 2 may also include a third structural assembly movably connected to the first structural assembly 21 and the second structural assembly 22. The first structural assembly 21 and the second structural assembly 22 may slide and/or rotate relative to the third structural assembly to different poses. In different poses, the structural form of the third structural assembly may be different. That is, the first structural assembly 21 and the second structural assembly 22 may change their poses by sliding and/or rotating relative to the third structural assembly, and in the process of changing the poses, the structural form of the third structural assembly also changes. The structural form of the third structural assembly may refer to the structural shape the third structural assembly presents. By setting up a third structural assembly to connect the first structural assembly 21 and the second structural assembly 22, the electronic device manufacturer can make the first structural assembly 21 and the second structural assembly

22 into the same structure. In this way, large-scale rapid production of parts and components is achieved and the interchangeability of parts and components is improved. In addition, the first structural assembly 21 and the second structural assembly 22 have the same structure, which is beneficial to completing the symmetrical design of the overall structure of the electronic device.

Figure 3:
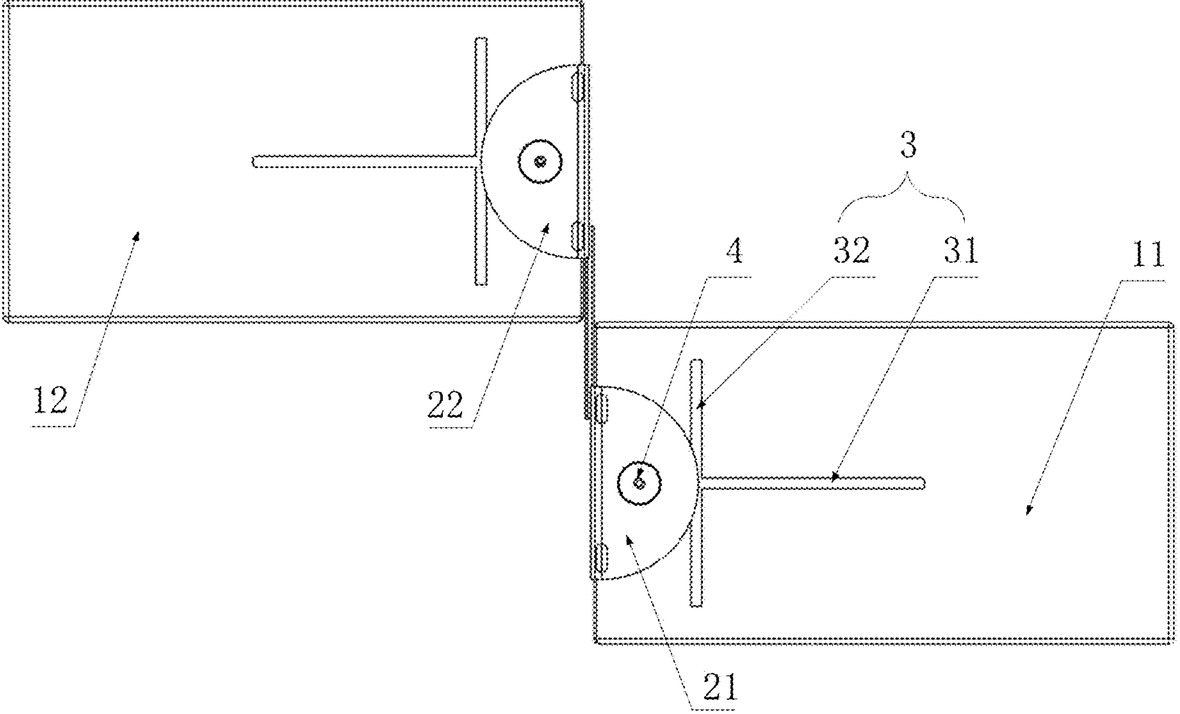
FIG. 3 is a schematic diagram of the electronic device switching from a device form shown in FIG. 1 to another device form.
Figure 15:
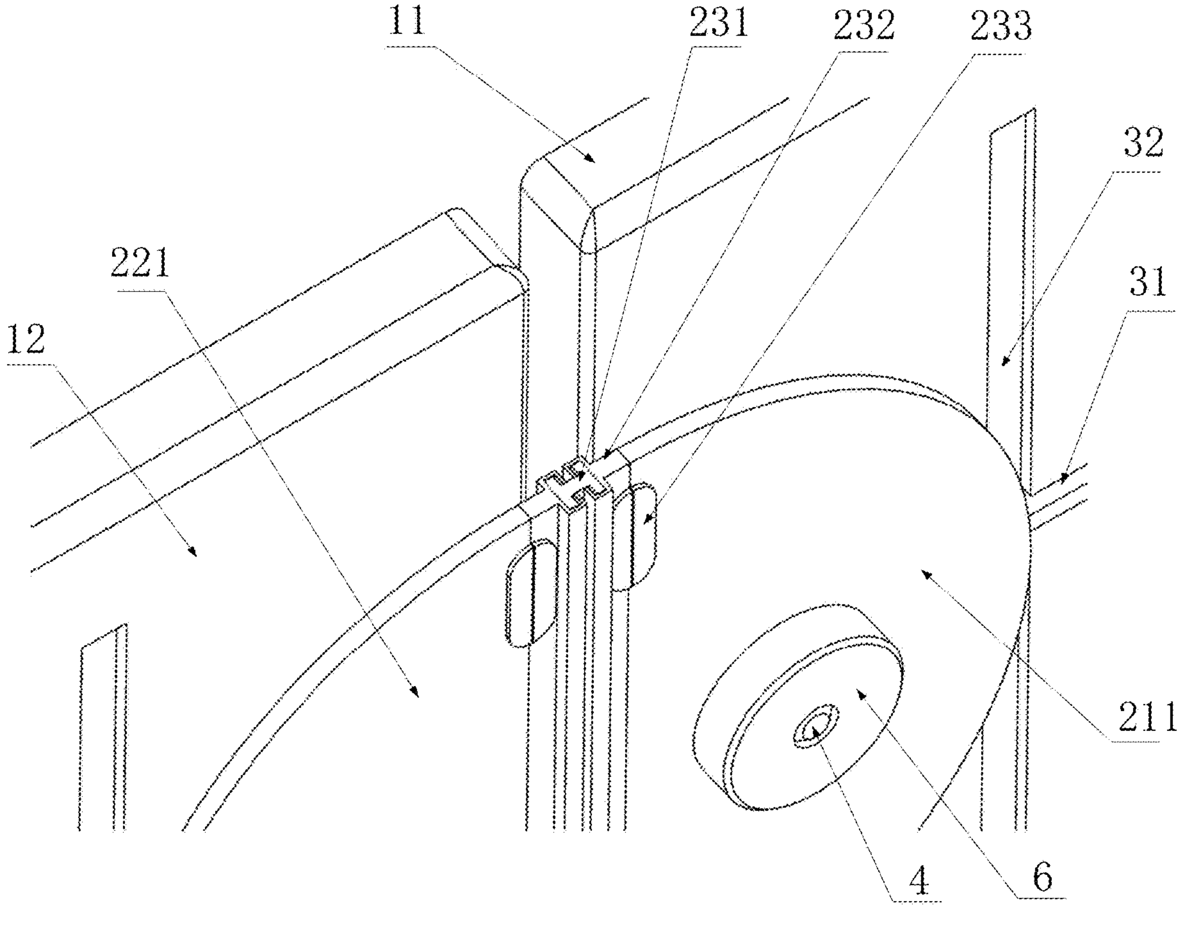
FIG. 15 is a partial perspective view of the electronic device shown in FIG. 1.
Figure 16:
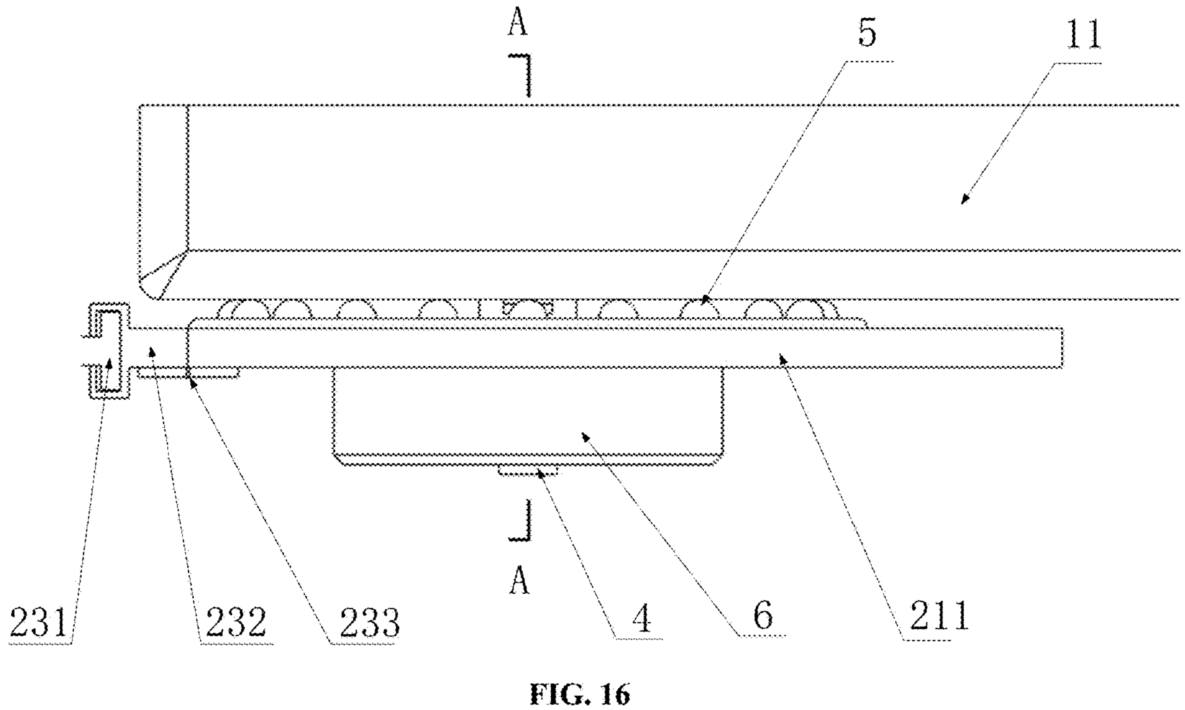
FIG. 16 is a partial top view of the electronic device shown in FIG. 1.

As shown in FIG. 15 and FIG. 16, in this embodiment, the third structural assembly includes a first connecting structure 232, the first connecting structure 232 being rotatably connected to the first structural assembly 21 through at least one first connecting member 233, and has a first connecting part; a second connecting structure (not shown in the accompanying drawings), the second connecting structure being rotatably connected to the second structural assembly 22 through at least one second connecting member (not shown in the accompanying drawings), and has a second connecting part; a first shaft 231, the first shaft 231 having two third connecting parts arranged opposite to each other. The first connecting part and the second connecting part can respectively cooperate with the corresponding third connecting part to realize relative sliding between the first connecting structure 232, the second connecting structure, and the first shaft 231. It should be noted that in this embodiment, the third structural assembly may be symmetrically designed with the first shaft 231 as the center such that parts structures and assembly relationship on both sides of the first shaft 231 are consistent. For convenience, only the part connected to the first structural assembly 21, that is, the part shown in FIG. 16, will be described here. It should be understood that in other embodiments, the third structural assembly may also adopt an asymmetric design. As shown in FIG. 16, a T-shaped sliding block is provided on one side of the first shaft 231 close to the first body 11 as the third connecting part, and a T-shaped sliding groove is provided on the first connecting structure 232 corresponding to the third connecting part as the first connecting part. The first connecting part and the third connecting part can slide together to achieve relative sliding between the first connecting structure 232 and the first shaft 231. In other embodiments, the third connecting part may be configured as a sliding groove, and the first connecting part may be configured as a sliding block, as long as the relative sliding between the first connecting structure 232 and the first shaft 231 can be realized. In addition, the present disclosure does not limit the cross-sectional shape of the groove. In addition, to the T-shaped shown in FIG. 16, other shapes such as a semicircle may also be used. As shown in FIG. 16, the side of the first connecting structure 232 away from the first shaft 231 is rotatably connected to the first structural assembly 21 through a hinge serving as the first connecting member 233 such that the first structural assembly 21 can be flipped relative to the third structural assembly. In other embodiments, the first connecting member 233 may also be configured as other parts such as a pivot, as long as the relative rotation between the first connecting structure 232 and the first structural assembly 21 can be realized. As shown in FIG. 15, the cross section of the first shaft 231 is an I-shape, and the first connecting structure 232 and the second connecting structure on both sides of the first shaft 231 can slide along the axial direction (i.e., the longitudinal direction) of the first shaft 231. In order to prevent the first connecting structure 232 and the second connecting structure from falling off the first shaft 231 when sliding to the end of the first shaft 231, a limit structure should be provided on the first shaft 231 to limit the first connecting structure 232 sliding to the limit position and the second connecting structure from sliding further. In this embodiment, when the first connecting structure 232 and the second connecting structure slide to the limit position, the pose of the first structural assembly 21 and the second structural assembly 22 is as shown in FIG. 3. At this time, the first body 11 and the second body 12 are completely staggered in the longitudinal direction of the first shaft 231.

In some embodiments, the first structural assembly 21 may include a first clamping structure. The first clamping structure may be disposed on the first side of the first body 11 where the target functional member is not disposed, and the first clamping structure may move relative to the first body 11 through a first guide structure disposed on a first side of the first body 11 to realize relative movement between the first body 11 and the first structural assembly 21. In some embodiments, the first clamping structure may also adjust the friction between the first structural assembly 21 and the first body 11. That is, the first structural assembly 21 may be connected to the first side of the first body 11 where no target functional member is set through the first clamping structure. The first clamping structure may be connected to the first side of the first body 11 in a clamping manner, which is beneficial to improving the reliability of the connection structure. The reason for connecting to the first side is to avoid obstruction of the target functional member described above. For example, when the first body 11 is a display, the target functional member may be a screen, and the first structural assembly 21 should be connected to the back of the display to avoid affecting the user's view of the screen. The relative movement between the first body 11 and the first structural assembly 21, that is, the first relative movement described above, may be realized by the cooperation between the first clamping structure and the first guide structure on the first body 11. The first guide structure may be disposed on the first side of the first body 11 and mainly guides the movement of the first clamping structure such that the first relative movement described above can obtain a desired specific form. The first clamping structure is provided to adjust the friction between the first structural assembly 21 and the first body 11 in order to reduce the friction such that the first relative movement can proceed more smoothly, and to increase the friction such that the first structural assembly 21 and the first body 11 can remain relatively fixed. For example, before switching from the device state shown in FIG. 3 to the device state shown in FIG. 4, the friction between the first structural assembly 21 and the first body 11 needs to be reduced by the first clamping structure. In this way, the user can easily push the first body 11 to the left in FIG. 3. When the first body 11 moves relative to the first structural assembly 21 to the position shown in FIG. 4, the friction between the first structural assembly 21 and the first body 11 is increased by the first clamping structure. In this way, when the user uses the device state shown in FIG. 4, the first body 11 is not easily dislocated due to external force, thereby ensuring the stability of the target device state.

Similarly, the second structural assembly 22 may include a second clamping structure. The second clamping structure may be disposed on the second side of the second body 12 where the target functional member is not disposed, and the second clamping structure may move relative to the second body 12 through a second guide structure disposed on the second side of the second body 12 to realize relative movement between the second body 12 and the second structural assembly 22. In some embodiments, the second clamping structure may also adjust the friction between the second structural assembly 22 and the second body 12.

As shown in FIG. 15 to FIG. 20, in this embodiment, the first body 11 includes a first plate 112. The first plate 112 may be used to enhance the structural strength of the first body 11 on the first side, and the first guide structure is a first hole structure 3 provided on the first plate 112. That is, the first plate 112 serves as both a strength reinforcement member on the side of the first body 11 where the target functional member is not provided and a connecting part of the first clamping structure to which the first guide structure is provided for connection. The first guide structure is set as the first hole structure 3 in order to form a relatively large clamping support on the two opposite sides of the first plate 112. More specifically, the first clamping structure may include a second plate 212, the second plate 212 being disposed between the first body 11 and the first plate 112, and the first clamping structure may also include a second shaft (not shown in the accompanying drawings) facing away from the first body 11 and penetrating the first hole structure 3; a third plate 211, the third plate 211 being sleeved on the portion of the second shaft protruding from the first plate 112 and can move in the extension direction of the second shaft to adjust the gap between the third plate 211 and the second plate 212. That is, the space for accommodating the second plate 212 is formed between the main body portion of the first body 11 (the portion where the target functional member 111 is located) and the first plate 112. When the first clamping structure moves along the first hole structure 3, the second plate 212 moves in this space. The second shaft on the second plate 212 passes through the first hole structure 3 and extends out of the space. The third plate 211 is sleeved on the protruding portion of the second shaft, thereby clamping the first plate 112 together with the second plate 212. The third plate 211 may move in the extension direction of the second shaft, that is, in the axial direction of the second shaft. Therefore, when the third plate 211 approaches the second plate 212, the gap between the two becomes smaller, and the clamping force of the two on the first plate 112 increases. On the contrary, when the third plate 211 is away from the second plate 212, the gap between the two becomes larger, and the clamping force of the two on the first plate 112 is reduced.

Similarly, the second body 12 may include a fourth plate disposed on the second side. The fourth plate may be used to enhance the structural strength of the second body 12 on the second side, and the second guide structure may be a second hole structure provided on the fourth plate. The second clamping structure may include a fifth plate disposed between the second body 12 and the fourth plate, and a sixth plate sleeved with the portion of the third shaft protruding from the fourth plate. The fifth plate may include a third shaft facing away from the second body 12 and the second hole structure may pass through the fifth plate. The six plates may move in the extension direction of the third axis to adjust the gap between the sixth plate and the fifth plate.

For the convenience of adjusting the gap between the third plate 211 and the second plate 212, in this embodiment, the first clamping structure also includes a first fastener 6. The first fastener 6 is sleeved on the portion of the second shaft protruding from the third plate 211, and can move toward or away from the third plate 211 along the extension direction of the third plate 211 to drive the third plate 211 to approach or move away from the second plate 212. More specifically, the first fastener 6 may be set as a nut, which is rotatably matched with the external thread on the second shaft. The gap between the third plate 211 and the second plate 212 can be reduced and increased by tightening and loosening the first fastener 6. In other embodiments, the first fastener 6 may take other forms, such as a retaining spring, and engage with one of a series of retaining positions distributed along the axial direction on the second shaft. The gap between the third plate 211 and the second plate 212 can be adjusted by moving the first fastener 6 to different retaining positions. In addition, the first fastener 6 may be omitted, and a threaded hole may be provided on the third plate 211 to rotate with the external thread on the second shaft. For example, the second shaft can be rotatably connected to the second plate 212, and the gap between the third plate 211 and the second plate 212 can be adjusted by rotating the second shaft forward and backward.

Figure 2:
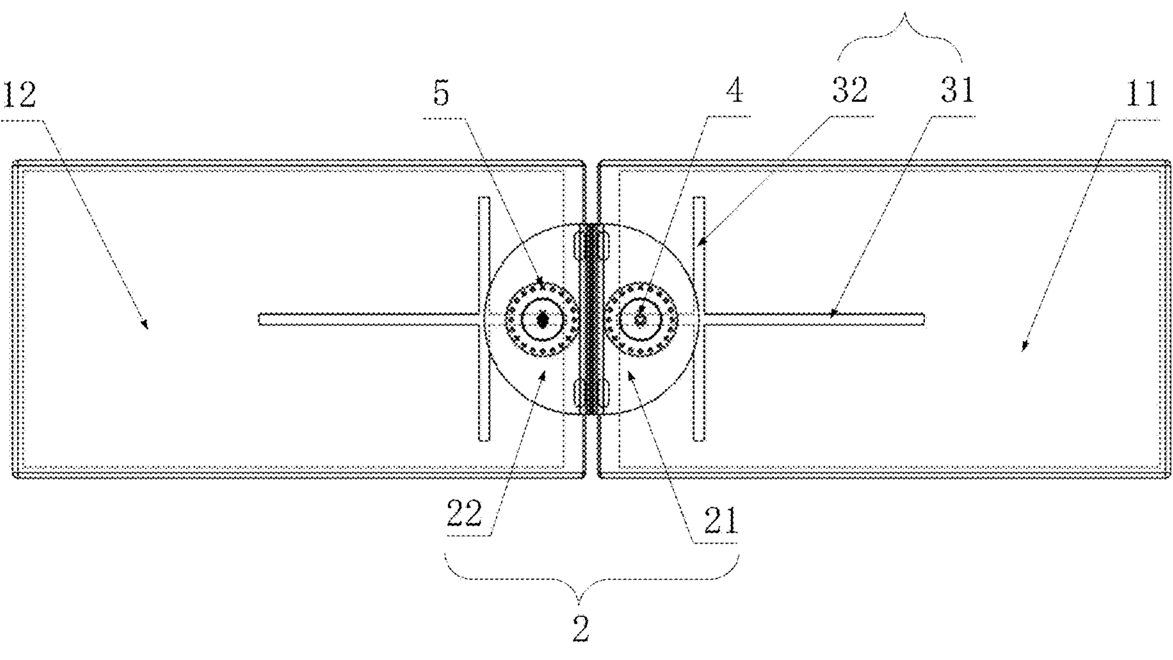
FIG. 2 is a perspective view of FIG. 1.
Figure 17:
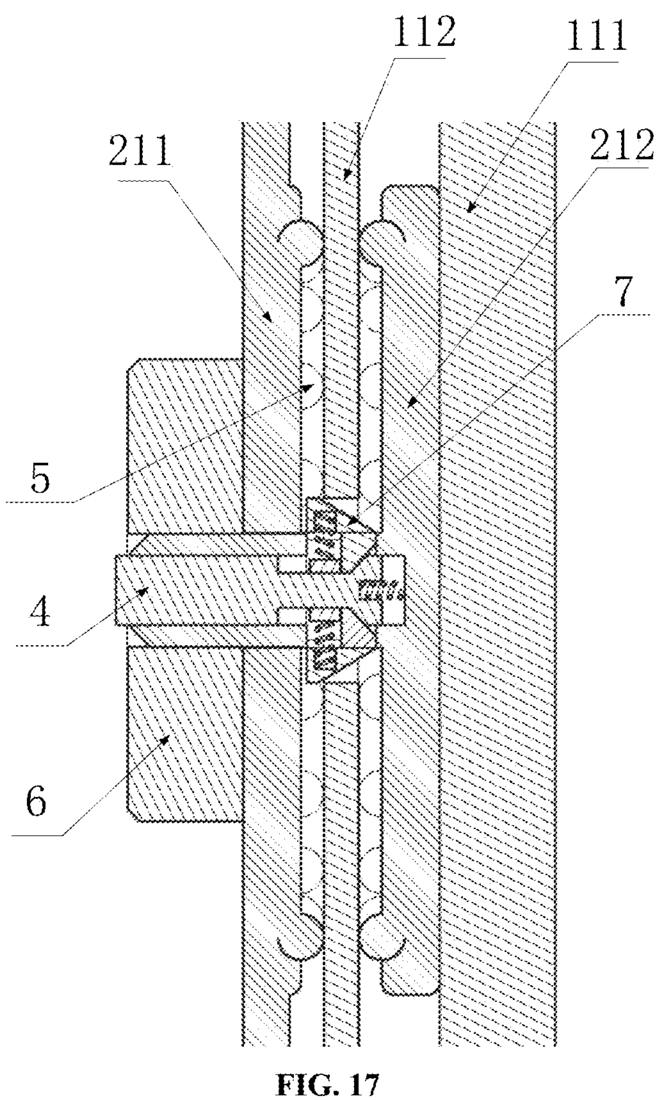
FIG. 17 is a cross-sectional view of line A-A in FIG. 16.

For the convenience of setting the motion resistance between the first structural assembly 21 and the first plate 112 as needed, the first clamping structure may also include a first damping structure. The first damping structure may be disposed between the second plate 212 and the first plate 112 and/or between the third plate 211 and the first plate 112 to increase or decrease the friction between the first structural assembly 21 and the first plate 112. As shown in FIG. 2, FIG. 16 and FIG. 17, in this embodiment, a plurality of balls 5 are disposed between the second plate 212 and the first plate 112 and between the third plate 211 and the first plate 112 as the first damping structure. In this way, when the first structural assembly 21 and the first plate 112 move relative to each other, the movement resistance between the two can be relatively small. That is, the plurality of balls 5 can reduce the friction between the first structural assembly 21 and the first plate 112. In other embodiments, if there is a need to set the relative movement between the first structural assembly 21 and the first plate 112 to be inflexible, a friction plate may be used as the first damping structure. The friction plate can increase the friction between the first structural assembly 21 and the first plate 112 to make the relative movement between the two more stable.

In some embodiments, the first clamping structure may also include a first limiting structure. The first limiting structure may be movably disposed in the groove structure of the second shaft, and may be used to limit the relative movement between the first structural assembly 21 and the first body 11. That is, a groove structure can be arranged on the second shaft for installing the first limiting structure. The first limiting structure is movable, and the user can limit the relative movement between the first structural assembly 21 and the first body 11 and release the limit by operating the first limiting structure. With this arrangement, the relative movement between the first structural assembly 21 and the first body 11 can be restricted or released conveniently without changing the gap between the third plate 211 and the second plate 212.

Figure 12:
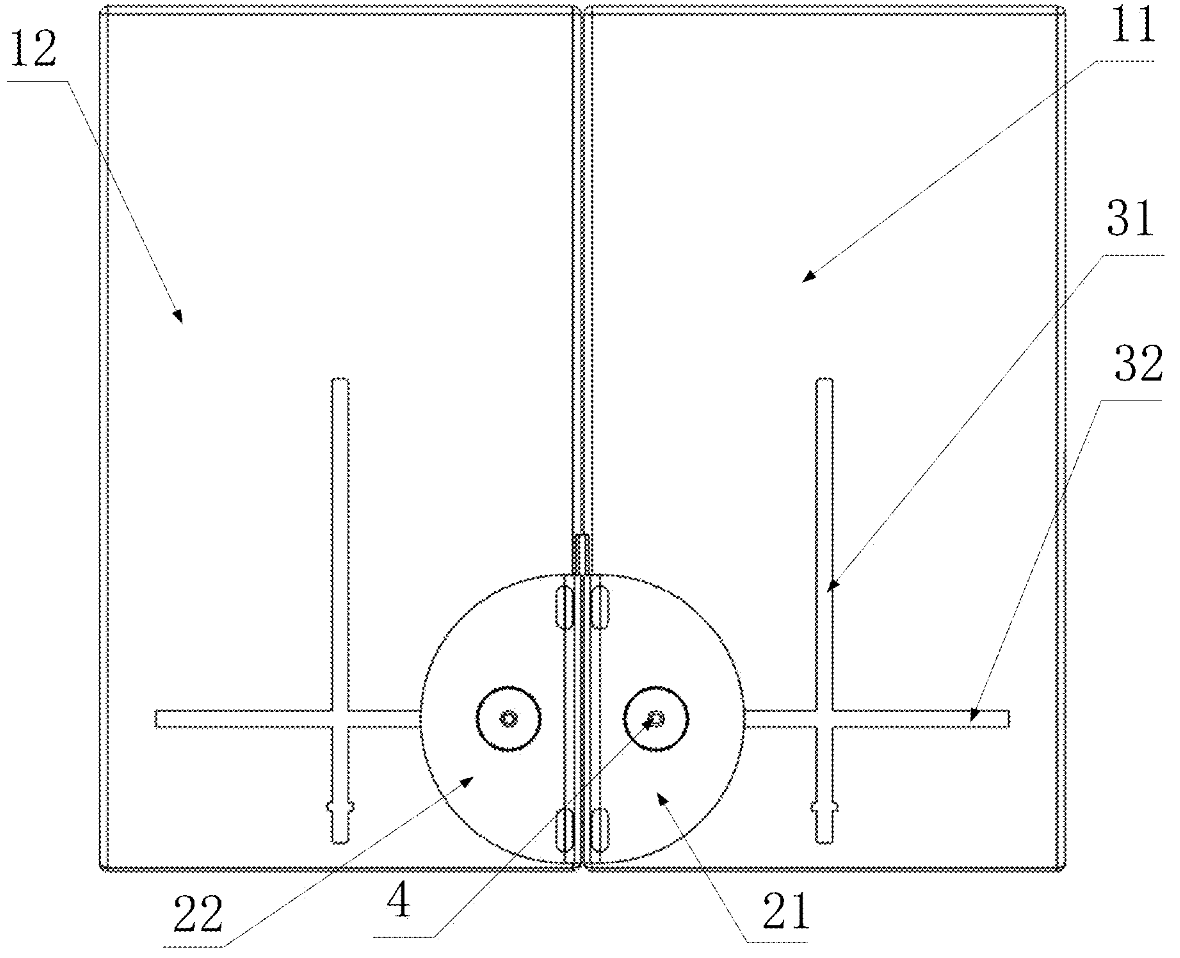
FIG. 12 is a schematic diagram of the electronic device switching from a device form shown in FIG. 11 to another device form.
Figure 18:
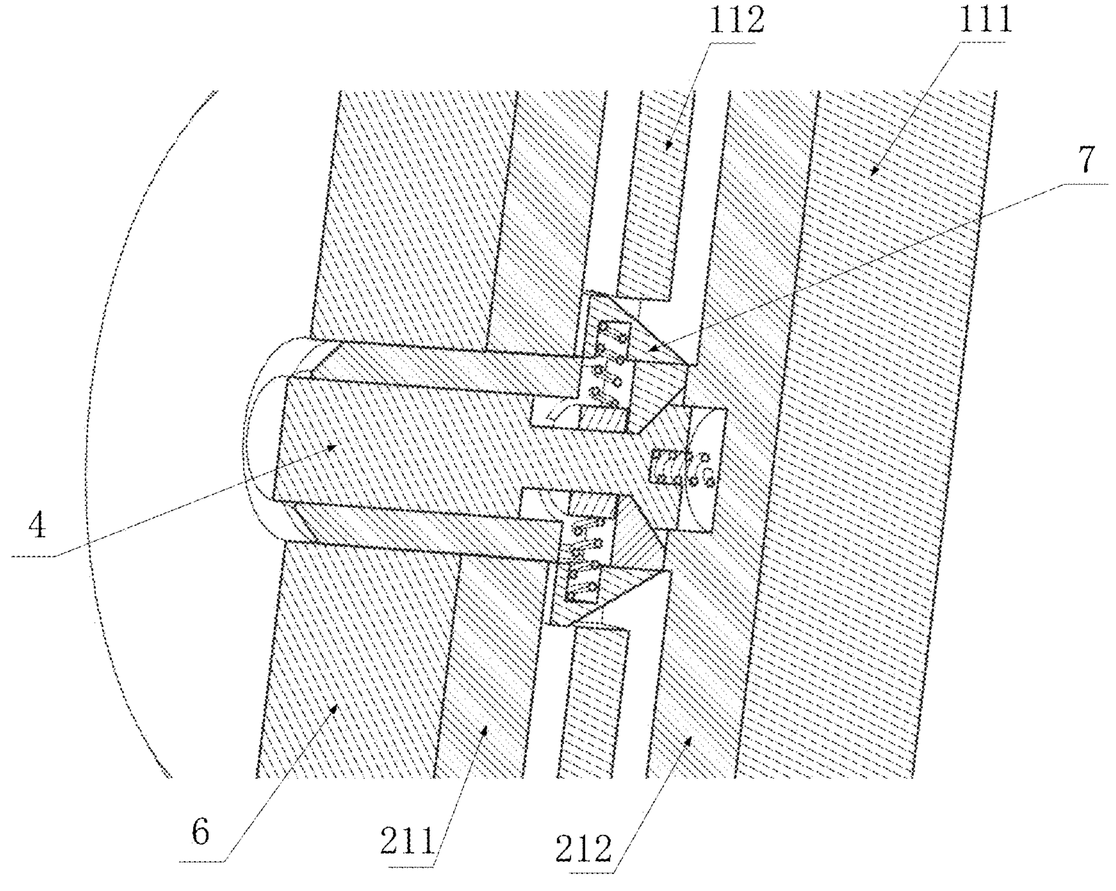
FIG. 18 is a perspective view of FIG. 17.
Figure 19:
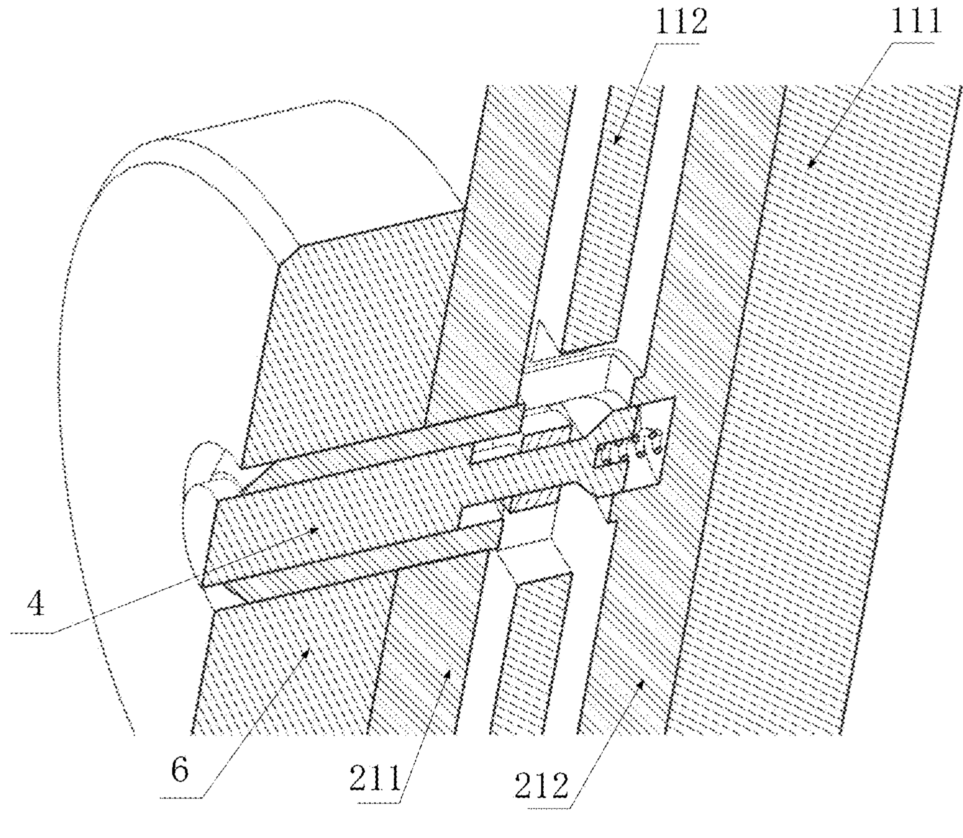
FIG. 19 is a schematic diagram of FIG. 18 without a locking member 7.
Figure 20:
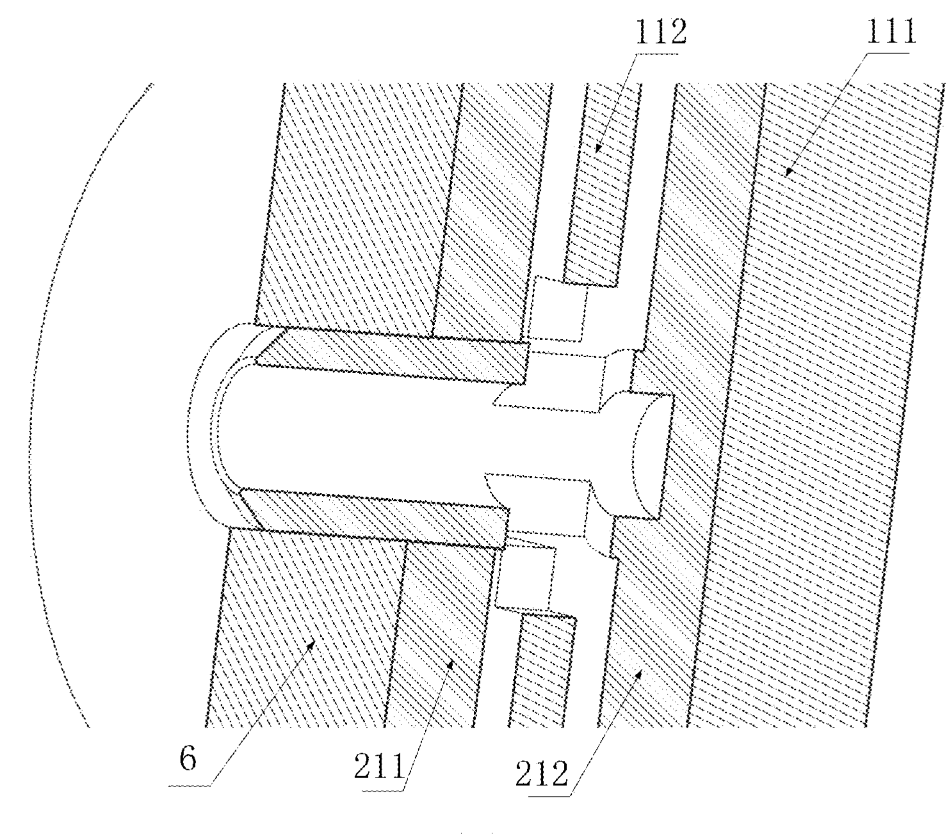
FIG. 20 is a schematic diagram of FIG. 19 without an unlock button 4.

As shown in FIG. 17 to FIG. 20, in this embodiment, the first limiting structure includes a first unlocking button 4 and a first locking member 7. The first unlocking button 4 is connected to the second plate 212 through a first elastic reset member, and the first locking member 7 is connected to the second shaft through a second elastic reset member. The first unlocking button 4 can move relative to the second under the action of the first elastic reset member and drive the first locking member 7 to abut against the inner wall of the first hole structure 3, thereby limiting the relative movement between the first structural assembly 21 and the first body 11. When the first unlocking button 4 is pressed, the first locking member 7 can move relative to the second shaft in a direction away from the inner wall of the first hole structure 3 under the action of the second elastic reset member, thereby releasing the restriction on the relative movement between the first structural assembly 21 and the first body 11. More specifically, in this embodiment, an axial groove and a radial groove that penetrates the axial groove are both arranged on the second shaft. That is, the groove structure of the second shaft includes an axial groove and a radial groove, and its half-section structure is shown in FIG. 20. Refer to FIG. 19, the first unlocking button 4 and a compression spring as the first elastic reset member are installed in the axial groove of the second shaft. The first unlocking button 4 is sleeved with a collar that is relatively fixed to the second shaft. The first unlocking button 4 can slide relative to the collar. Refer to FIG. 18, the first locking member 7 and a tension spring as the second elastic reset member are installed in the radial groove of the second shaft, and the two ends of the tension spring are respectively connected to the collar on the first unlocking button 4 and the first locking member 7. Referring to FIG. 17, the first locking member 7 and the first unlocking button 4 are connected in transmission via a wedge-shaped matching structure. In the natural state, that is, when the user does not press the first unlocking button 4, the compression spring in the axial groove pushes the first unlocking button 4 outward, and the first unlocking button 4 pushes the first locking member 7 outward through the wedge-shaped matching structure, and the first locking member 7 abuts against the inner wall of the first hole structure 3 set in the first plate 112. In this way, the relative movement between the first structural assembly 21 and the first body 11 is restricted. When the user presses the first unlocking button 4, the compression spring in the axial groove is compressed, the first unlocking button 4 moves inward, and the first locking member 7 loses the support of the first unlocking button 4 such that the tension spring in the radial groove pulls the first locking member 7 into the second shaft. In this way, the first locking member 7 is disengaged from the inner wall of the first hole structure 3, thereby releasing the restriction on the relative movement between the first structural assembly 21 and the first body 11. As shown in FIG. 20, in order to better realize the limiting function of the first locking member 7, a slot cooperating with the first locking member 7 can be provided on the inner wall of the first hole structure 3. The first locking member 7 can be inserted into the slot such that the first structural assembly 21 and the first body 11 cannot move relative to each other. After the first unlocking button 4 is pressed, the first locking member 7 is withdrawn from the slot such that the first structural assembly 21 and the first body 11 can move relative to each other. More specifically, the slot for cooperating with the first locking member 7 can be arranged at a suitable position of the first hole structure 3 as needed. As shown in FIG. 12, in this embodiment, the first hole structure 3 includes a first straight groove 31 and a second straight groove 32. A slot is provided on the first straight groove 31 for cooperating with the first locking member 7 at a position close to the edge of the first body 11. When the first clamping structure moves along the first hole structure 3 such that the first unlocking button 4 reaches the slot, after the first unlocking button 4 is released, the first clamping structure can be fixed at this position of the first body 11. That is, the first body 11 cannot move relative to the first structural assembly 21, and when the first body 11 needs to be moved or rotated, the operation can be smoothly performed by pressing the first unlocking button 4.

Refer to the foregoing description that the first clamping structure may include the first fastener 6, the first damping structure and/or the first limiting structure, similarly, the second clamping structure may also include at least one of: a second fastener, a second damping structure, and/or a second limiting structure. The second fastener may be sleeved on the portion of the third shaft protruding from the sixth plate, and may move toward or away from the sixth plate along the extension direction of the third shaft to drive the sixth plate to approach or move away from the fifth plate. The second damping structure may be arranged between the fifth plate and the fourth plate and/or between the sixth plate and the fourth plate, and may be used to increase or reduce the friction between the second structural assembly 22 and the second plate 212. The second limiting structure may be movably disposed on the groove structure of the third shaft, and may be used to limit the relative movement between the second structural assembly 22 and the second body 12. In addition, the second limiting structure may include a second unlocking button and a second locking member. The second unlocking button may be connected to the fifth plate through a third elastic reset member, and the second locking member may be connected to the third shaft through a fourth elastic reset member. The second unlocking button can move relative to the third shaft under the action of the third elastic reset member and drive the second locking member to abut against the inner wall of the second hole structure to limit the relative movement between the second structural assembly 22 and the second body 12. When the second unlocking button is pressed, the second locking member can move relative to the third shaft in a direction away from the inner wall of the second hole structure under the action of the fourth elastic reset member, thereby releasing the restriction on the relative movement between the second structural assembly 22 and the second body 12.

Figure 21:
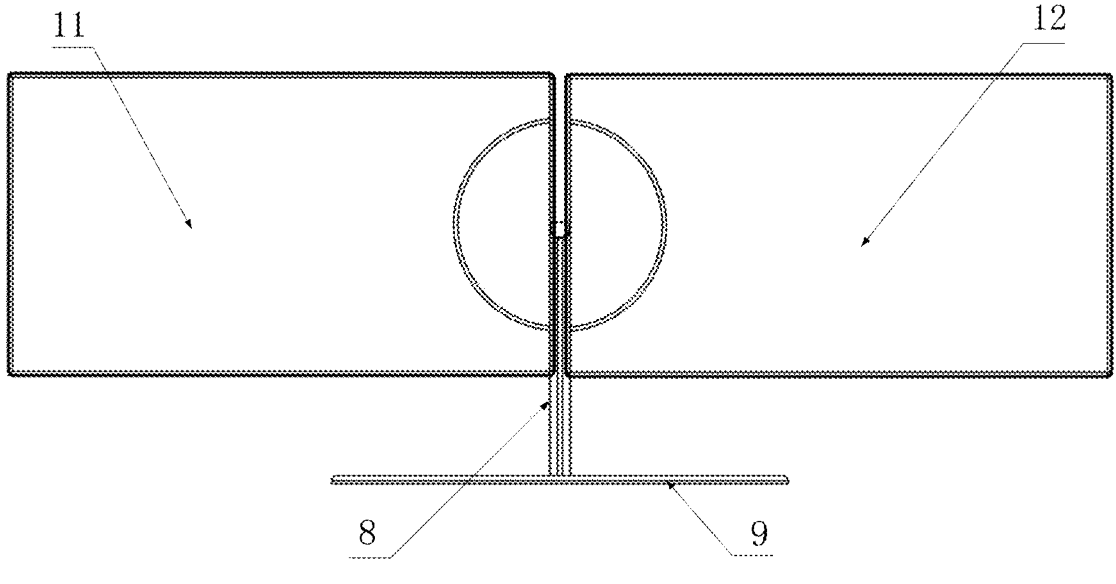
FIG. 21 is a schematic diagram of the electronic device according to an embodiment of the present disclosure.

As shown in FIG. 15 and FIG. 21, in order to facilitate the placement of the electronic device on a target bearing surface such as a desktop for use, the electronic device may further include a support structure connected to the first shaft 231. The support structure is used to place the electronic device on the target bearing surface. In this embodiment, the support structure includes a support column 8 and a base 9. The support column 8 connects the base 9 and the first shaft 231. The base 9 is used to increase the support area. In some embodiments, the support structure can be switched to different structural forms in its support direction to adjust the distance between the first shaft 231 and the target bearing surface. For example, the support column 8 can be extended or retracted, thereby adjusting the distance between the first shaft 231 and the base 9. It should be noted that FIG. 21 illustrates the front side of the display as the first body 11 and the second body 12, that is, the side with the screen. FIG. 21 shows in perspective the outlines of the first structural assembly 21 and the second structural assembly 22 connected to the back of the display, namely, the two semicircles in FIG. 21.

Figure 4:
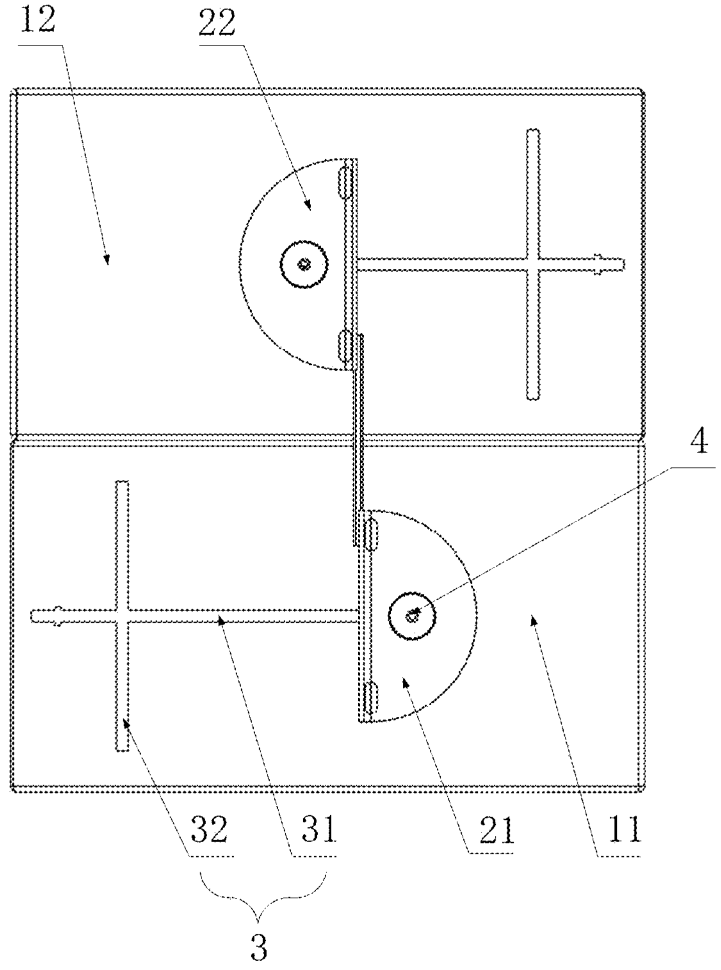
FIG. 4 is a schematic diagram of the electronic device switching from a device form shown in FIG. 3 to another device form.

The following describes the device form that can be realized by the electronic device shown in FIG. 21 in conjunction with FIG. 1 to FIG. 14. The first body 11 and the second body 12 respectively include a first edge surface and a second edge surface disposed adjacent to each other. For convenience, the first body 11 and the second body 12 are both rectangular parallelepipeds, and the first edge surface and the second edge surface correspond to the adjacent short side and long side, respectively. In the device form shown in FIG. 21, the electronic device presents a horizontal screen with left and right sides. That is, the short side of the first body 11 and the short side of the second body 12 are arranged opposite to each other, and the left and right horizontal screens are mostly used for office work, document processing and Internet surfing. It should be noted that in the example of FIG. 21, there is a certain gap between the first body 11 and the second body 12 in the horizontal screen state. In other embodiments, this gap may be set to zero. That is, the short side of the first body 11 and the short side of the second body 12 can be arranged opposite to each other and in contact such that the two screen can be closer to each other, and the short sides also support each other to make the device more stable. The back of the device form shown in FIG. 21 is shown in FIG. 1 (without the support structure). The first body 11 in FIG. 1 is moved downward and the second body 12 is moved upward, such that the first body 11 and the second body 12 are staggered with each other as shown in FIG. 3. Subsequently, the first body 11 in FIG. 3 is moved to the left, and the second body 12 is moved to the right, and the up-and-down horizontal form shown in FIG. 4 is obtained. The up-and-down horizontal screen form is mostly used for games or video editing. As shown in FIG. 4, in the up-and-down horizontal screen form, the long side of the first body 11 and the long side of the second body 12 are disposed opposite to and in contact with each other. It should be noted that in order to make the shape of the first hole structure 3 simpler, the first hole structure 3 is configured to be composed of a first straight groove 31 and a second straight groove 32 that are perpendicular to each other and connected. As shown in FIG. 2, the first straight groove 31 is perpendicular to the short side of the first body 11, and the second straight groove 32 is perpendicular to the long side of the first body 11. In other embodiments, the first hole structure 3 may also include a curved groove section as long as it does not affect the mutual movement between the first body 11 and the second body 12.

Figure 5:
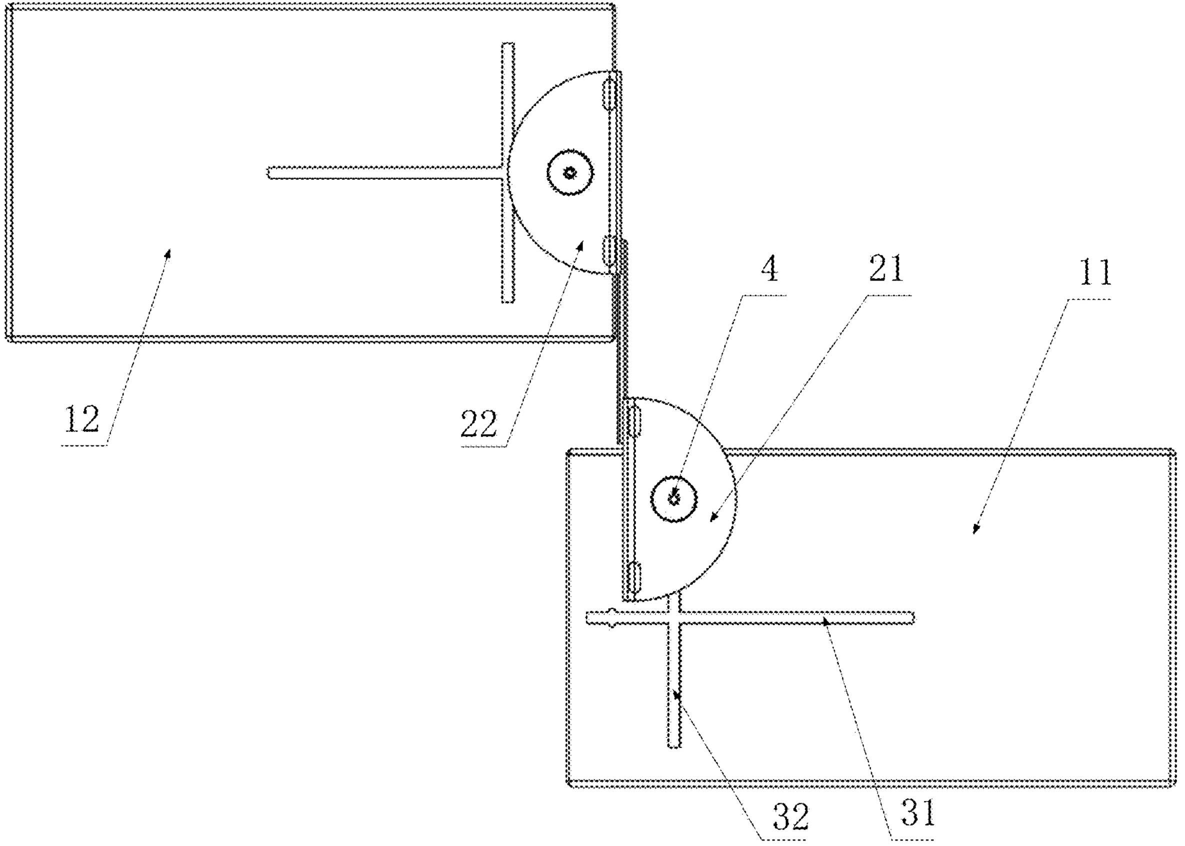
FIG. 5 is a schematic diagram of the electronic device switching from a device form shown in FIG. 3 to another device form.
Figure 6:
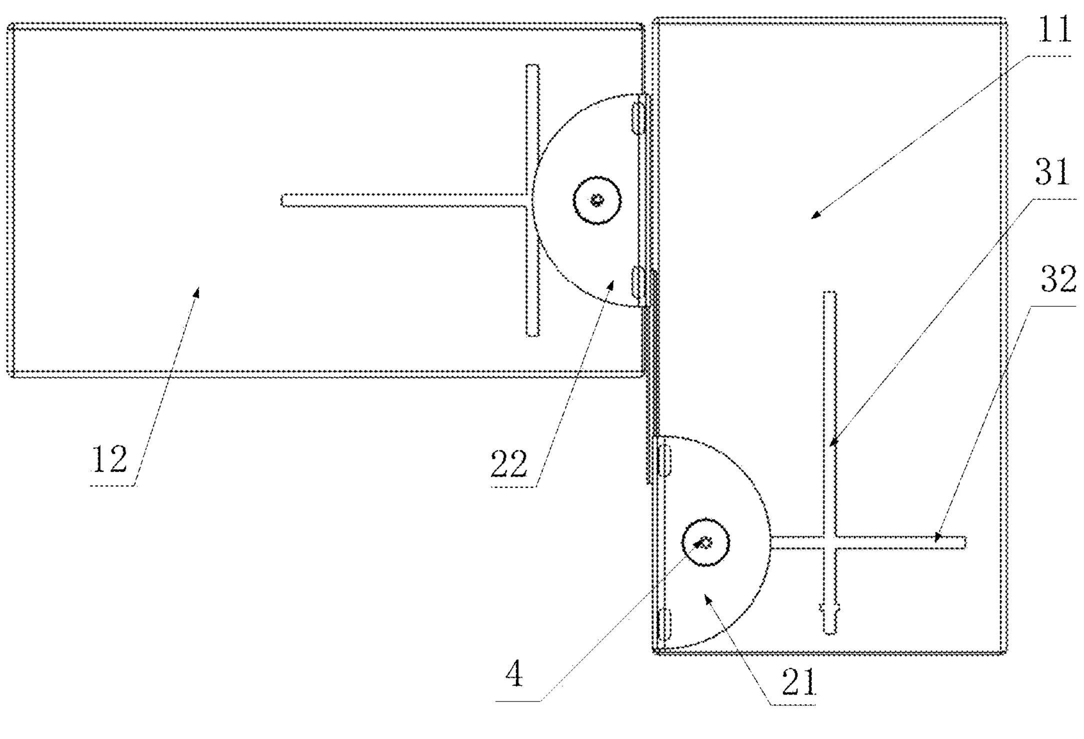
FIG. 6 is a schematic diagram of the electronic device switching from a device form shown in FIG. 5 to another device form.
Figure 7:
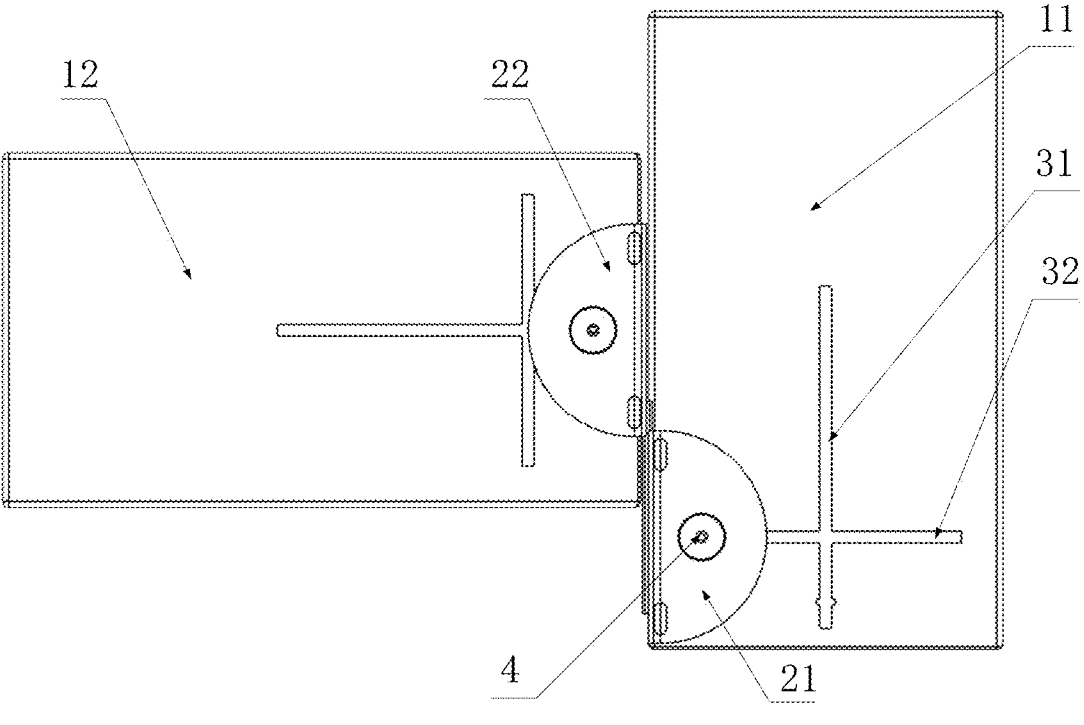
FIG. 7 is a schematic diagram of the electronic device switching from a device form shown in FIG. 6 to another device form.

The electronic device may also be changed from the device form shown in FIG. 3 to a one-horizontal-one-vertical screen form shown in FIG. 7. This device form is mostly used by programmers to write code. The switching process includes: moving the first body 11 in FIG. 3 to the left for a short distance such that the first unlocking button 4 reaches the intersection of the second straight groove 32 and the first straight groove 31, then moving the first body 11 downward to obtain the device form shown in FIG. 5. At this time the distance between the first unlocking button 4 and the long side above the first body 11 is equal to the distance between the first unlocking button 4 and the short side of the left side of the first body 11 in FIG. 3, such that the first body 11 in FIG. 5 is rotated 90° counterclockwise to obtain the device form in FIG. 6. Subsequently, the first body 11 in FIG. 6 is moved upward for a certain distance to obtain the one-horizontal-one-vertical screen form shown in FIG. 7. It should be noted that in this embodiment, the first hole structure 3 on the first body 11 and the second hole structure on the second body 12 are symmetrically designed as shown in FIG. 2. Therefore, a process similar to the above process can be performed on the second body 12 to obtain the final form of the first body 11 being the horizontal screen, and the second body 12 being the vertical screen.

Figure 8:
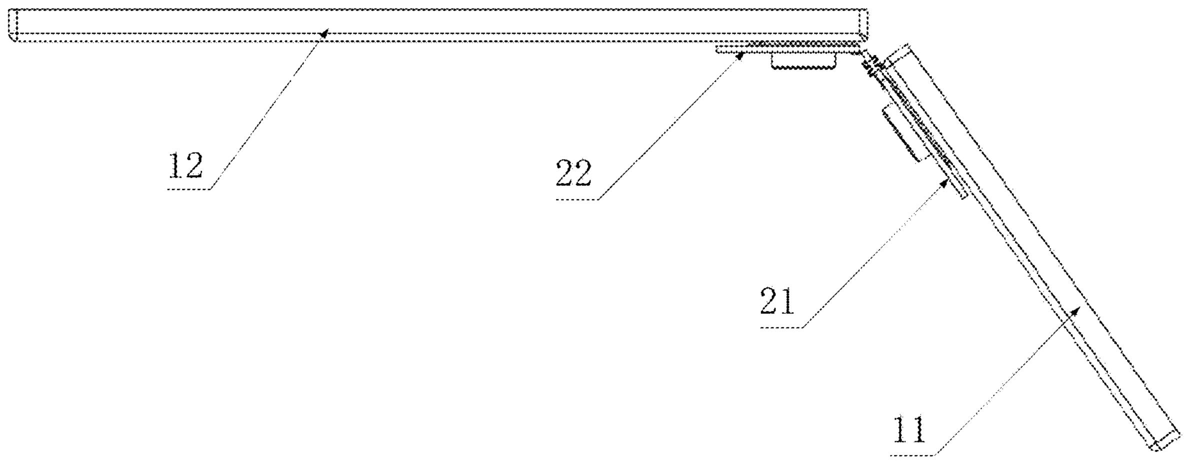
FIG. 8 is a top view of the electronic device switching from a device form shown in FIG. 7 to another device form.
Figure 9:
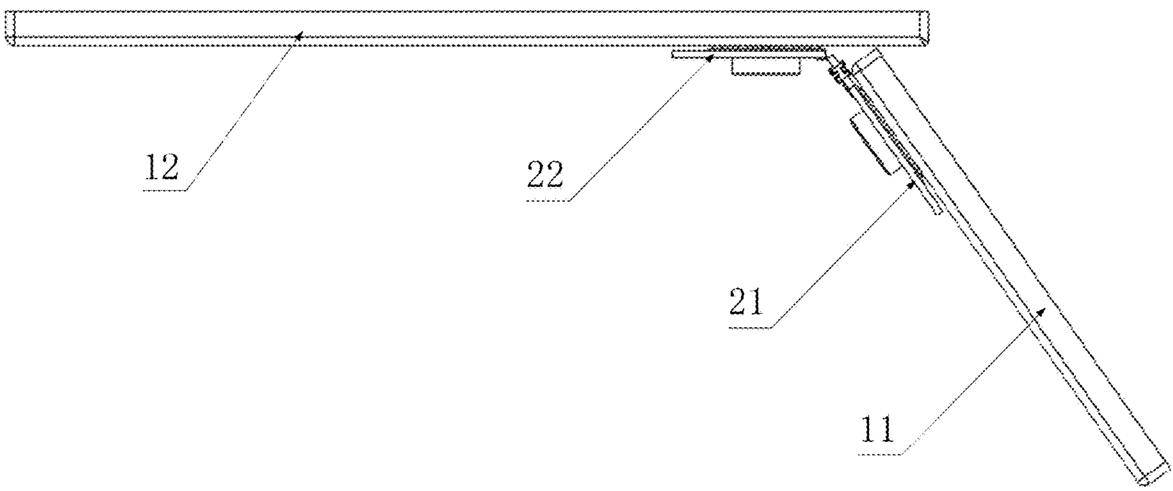
FIG. 9 is a schematic diagram of a second body 12 in FIG. 8 after moving a short distance to the right.
Figure 10:
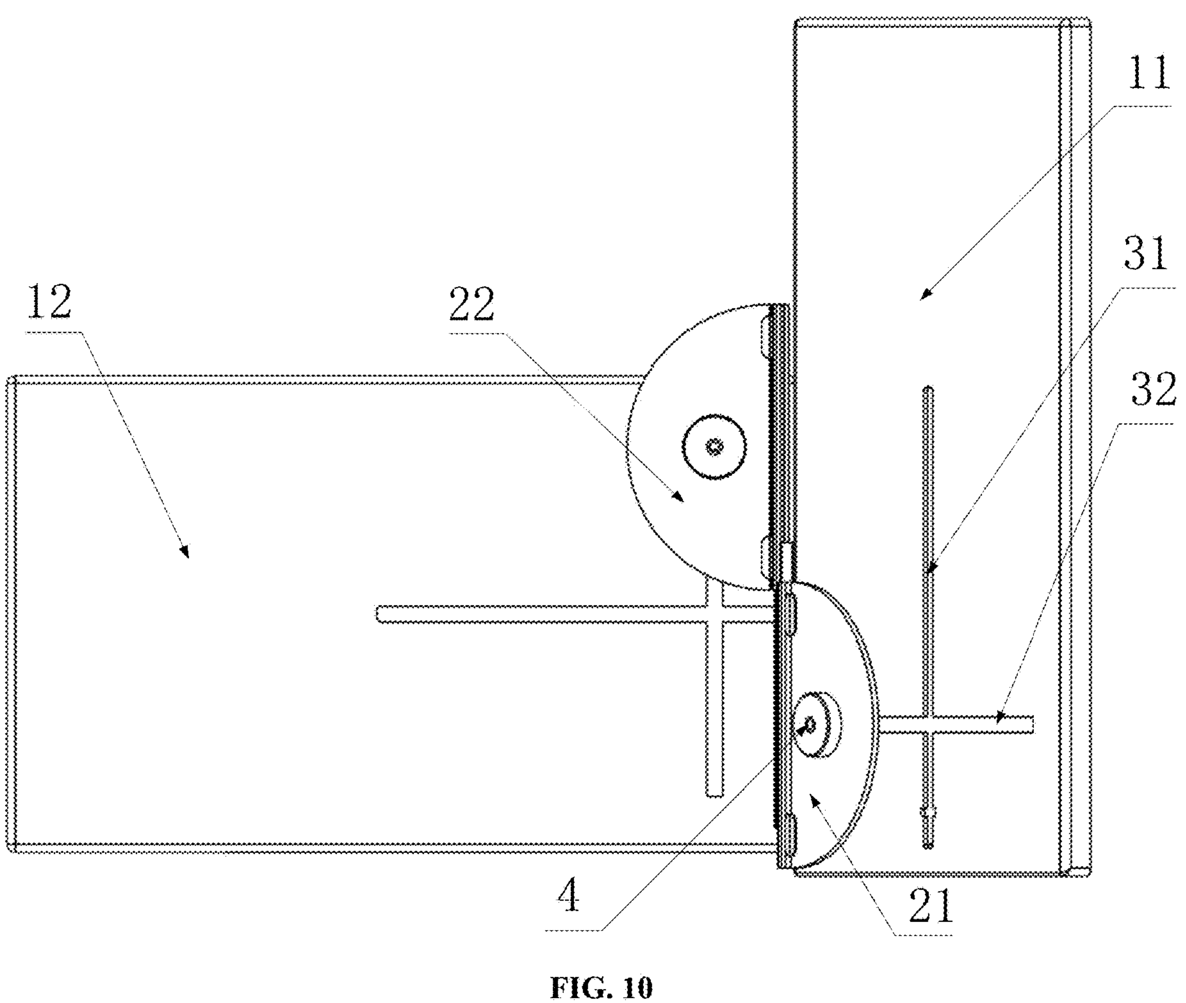
FIG. 10 is a front view of the electronic device switched from the device form shown in FIG. 9 to another device form.
Figure 11:
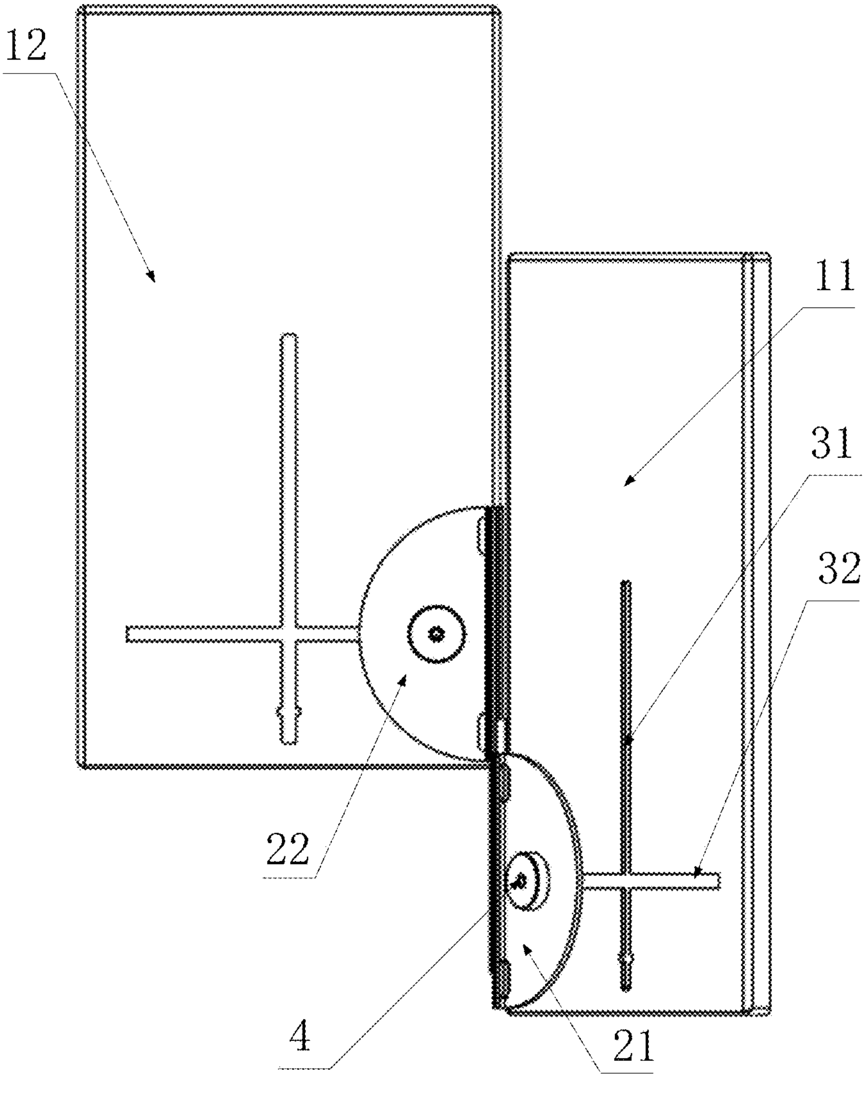
FIG. 11 is a schematic diagram of the electronic device switching from a device form shown in FIG. 10 to another device form.

The electronic device may also be changed from the device form shown in FIG. 7 to the left and right vertical form shown in FIG. 12. This left and right vertical screen form is mostly used for e-book reading. The switching process includes: flipping the first body 11 in FIG. 7 relative to the second body 12 by a certain angle to obtain the device form in a top view as shown in FIG. 8. This process is mainly to allow the first body 11 to avoid a position, leaving space for the second body 12 to rotate. Next, the second body 12 in FIG. 8 is moved rightward a short distance to obtain the device form shown in FIG. 9. At this time, the second unlocking button reaches the cross intersection of the second hole structure such that the device form shown in FIG. 10 can be obtained by moving the second body 12. The second body 12 in FIG. 10 is rotated 90° clockwise to obtain the device form shown in FIG. 11. Subsequently, the second body 12 in FIG. 11 is moved downward and the first body 11 is turned back to obtain the left and right vertical screen form shown in FIG. 12.

Figure 13:
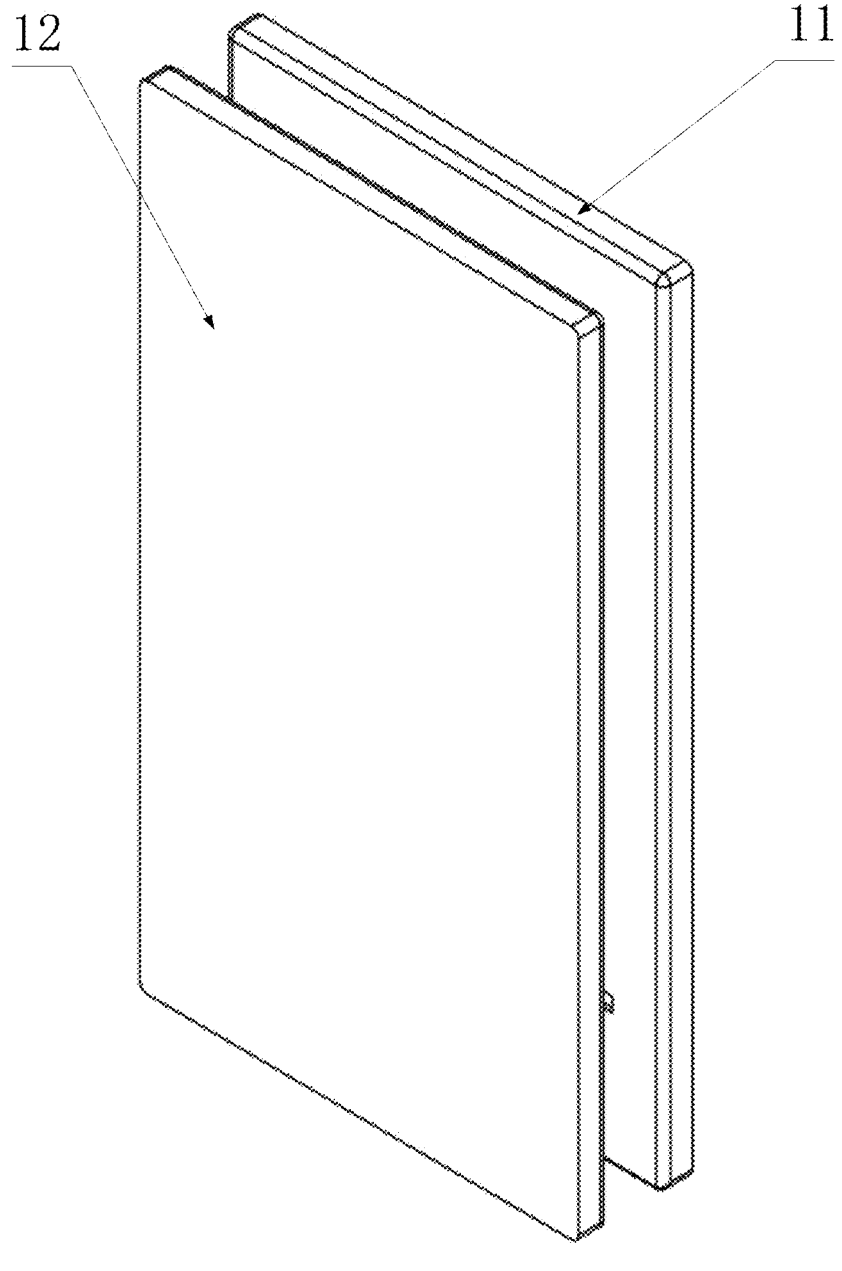
FIG. 13 is a perspective view of the electronic device switched from the device form shown in FIG. 12 to another device form.
Figure 14:
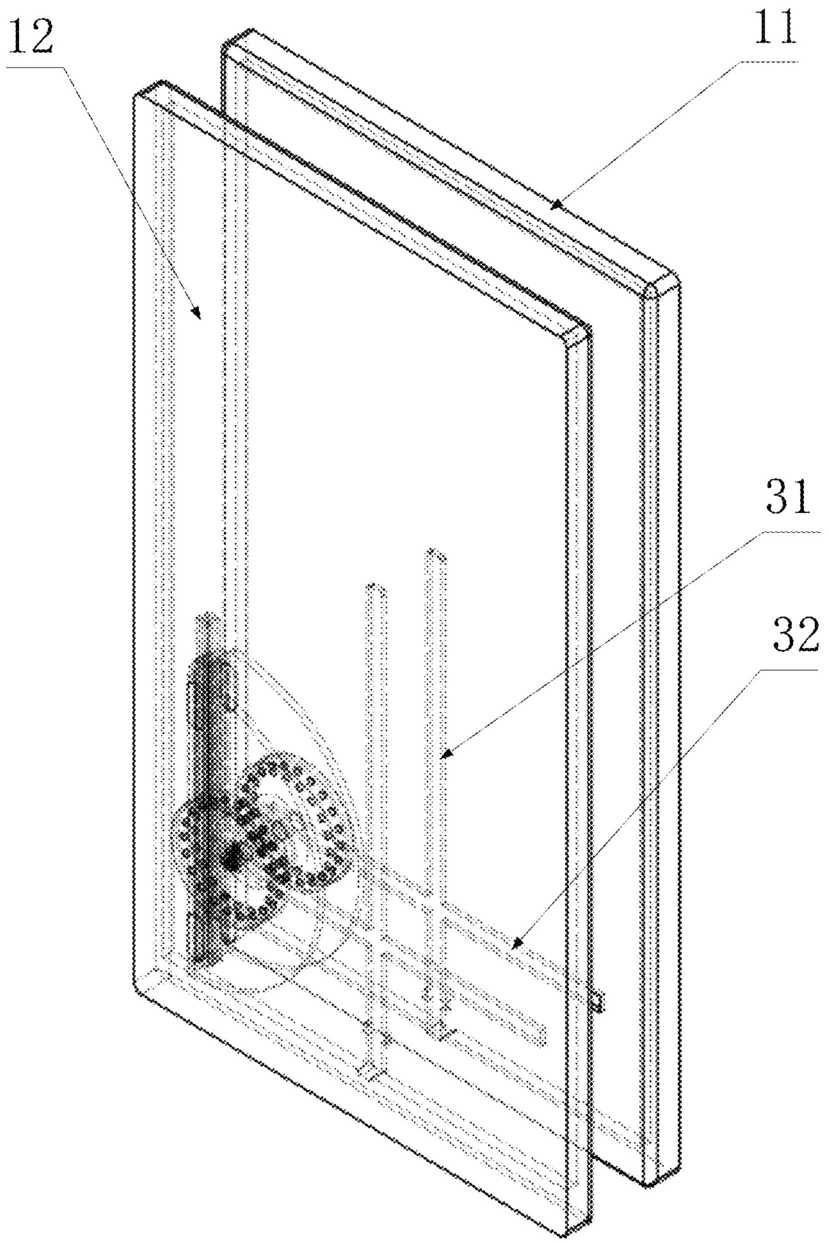
FIG. 14 is a perspective view of FIG. 13.

The electronic device may also be changed from the device form shown in FIG. 12 to the front and rear vertical screen form shown in FIG. 13. The front and rear vertical screen form is mostly used to simultaneously display information to the person facing the user. As shown in FIG. 13, in this device form, the first side of the first body 11 and the second side of the second body 12 are arranged opposite to each other, that is, the two displays are back-to-back. It should be noted that by flipping the first body 11 and/or the second body 12, the electronic device can be changed from the device form shown in FIG. 1 to a front-to-back horizontal screen form. In addition, the angle of the flipping movement of the first body 11 and the second body 12 from the flat state to the folded state can be any value between 0° to 180°. For example, the first body 11 and the second body 12 may be flipped 90° such that they form an L-shape when viewed from above. Then, on this basis, the first body 11 or the second body 12 can be moved such that the two are in a T-shape when viewed from a top view. For example, by flipping and moving the first body 11, the first side of the first body 11 can be arranged opposite to the first edge surface or the second edge surface of the second body 12.

Embodiments in this specification are described in a progressive manner, and the structure of each part focuses on the differences from the existing structure. The overall and partial structures of the electronic device can be obtained by combining the structures of the multiple parts described above.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the present disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. An electronic device comprising:

a first body;

a second body; and a connecting assembly, the connecting assembly including a first structural assembly movably connected to the first body, a second structural assembly movably connected to the second body, and a third structural assembly movably connected to the first structural assembly and the second structural assembly, the first structural assembly and the second structural assembly being configured to slide and/or rotate to different positions relative to the third structural assembly, wherein:

the electronic device is configured to switch to different device forms through a first relative movement between the first body and the first structural assembly and/or a second relative movement between the second body and the second structural assembly, and in different device forms, a relative position between the first structural assembly and the second structural assembly is different or same.

2. The electronic device of claim 1, wherein:

the relative position between the first structural assembly and the second structural assembly changes with the relative movement between the first body and second body; and/or, a type of third relative movement between the first structural assembly and the second structural assembly is same as or different from a type of the first relative movement and/or the second relative movement; and/or, the type of third relative movement between the first structural assembly and the second structural assembly is same as or different from the type of relative movement between the first body and the second body.

3. The electronic device of claim 1, wherein:

in different device forms, a structural form of the third structural assembly is different.

4. The electronic device of claim 1, wherein the third structural assembly includes:

a first connecting structure, first connecting structure being rotatably connected to the first structural assembly through at least one first connecting member, the first connecting structure including a first connecting part;

a second connecting structure, the second connecting structure being rotatably connected to the second structural assembly through at least one second connecting member, the second connecting structure having a second connecting part; and a first shaft, the first shaft having two third connecting parts arranged opposite to each other, the first connecting part and the second connecting part being configured to respectively cooperate with the corresponding third connecting parts to realize relative sliding between the first connecting structure, the second connecting structure and the first shaft.

5. The electronic device of claim 1, wherein the first structural assembly includes:

a first clamping structure, the first clamping structure being disposed on a first side of the first body where no target functional member is disposed, and being configured to move relative to the first body through a first guide structure disposed on the first side of the first body to realize relative movement between the first body and the first structural assembly, the first clamping structure being configured to adjust friction between the first structural assembly and the first body.

6. The electronic device of claim 5, wherein:

the first body includes a first plate disposed on the first side, the first plate being used to enhance the structural strength of the first boy on the first side, the first guide structure being a first hole structure disposed on the first plate.

7. The electronic device of claim 6, wherein the first clamping structure includes:

a second plate, the second plate being disposed between the first body and the first plate, and having a second shaft facing away from the first body and penetrating the first hole structure;

a third plate, the third plate being sleeved on part of the second shaft protruding from the first plate and being configured to move in an extension direction of the second shaft to adjust a gap between the third plate and the second shaft.

8. The electronic device of claim 1, wherein the second structural assembly includes:

a second clamping structure, the second clamping structure being disposed on a second side of the second body where no target functional member is disposed, the second clamping structure being configured to move relative to the second body through a second guide structure disposed on the second side of the second body to realize relative movement between the second body and the second structural assembly, the second clamping structure being configured to adjust the friction between the second structural assembly and the second body.

9. The electronic device of claim 8, wherein:

the second body includes a fourth plate disposed on the second side, the fourth plate being used to enhance the structural strength of the second body on the second side, the second guide structure being a second hole structure provided on the fourth plate.

10. The electronic device of claim 9, wherein the second clamping structure includes:

a fifth plate disposed between the second body and the fourth plate, the fifth plate having a third shaft facing away from the second body and penetrating the second hole structure; and a sixth plate, the sixth plate being sleeved with part of the third shaft protruding from the fourth plate, the sixth plate being configured to move in an extension direction of the third shaft to adjust a gap between the sixth plate and the fifth plate.

11. The electronic device of claim 7, wherein the first clamping structure further includes at least one of:

a first fastener, the first fastener being sleeved on the part of the second shaft protruding from the third plate, the first fastener being configured to move along the extension direction of the second shaft to drive the third to move toward or away from the second plate;

a first damping structure, the first damping structure being disposed between the second plate and the first plate and/or between the third plate and the first plate, the first damping structure being used to increase or reduce the friction between the first structural assembly and the first plate; or a first limiting structure, the first limiting structure being movably disposed on a groove structure of the second shaft, the first limiting structure being used to limit the relative movement between the first structural assembly and the first body.

12. The electronic device of claim 10, wherein the second clamping structure further includes at least one of:

a second fastener, the second fastener being sleeved on the part of the third shaft protruding from the sixth plate, the second fastener being configured to move toward or away from the sixth along the extension direction of the third shaft to drive the sixth plate to move toward or away from the fifth plate;

a second damping structure, the second damping structure being disposed between the fifth plate and the fourth plate and/or between the sixth plate and the fourth plate, the second damping structure being used to increase or decrease the friction between the second structural assembly and the second plate; or a second limiting structure, the second limiting structure being movably disposed on a groove structure of the third shaft, the second limiting structure being used to limit the relative movement between the second structural assembly and the second body.

13. The electronic device of claim 11, wherein the first limiting structure includes:

a first unlocking button, the first unlocking button being connected to the second plate through a first elastic reset member; and a first locking member, the first locking member being connected to the second shaft through a second elastic reset member;

the first unlocking button being configured to move relative to the second shaft under the action of the first elastic reset member and drive the first locking member to abut against an inner wall of the first hole structure to limit the relative movement between the first structural assembly and the first body; when the first unlocking button is pressed, the first locking member being configured to move relative to the second shaft in a direction away from the inner wall of the first hole structure under the action of the second elastic reset member to release the restriction on the relative movement between the first structural assembly and the first body.

14. The electronic device of claim 12, wherein the second limiting structure includes:

a second unlocking button, the second unlocking button being connected to the fifth plate through a third elastic reset member; and a second locking member, the second locking member being connected to the third shaft through a fourth elastic reset member;

the second unlocking button being configured to move relative to the third shaft under the action of the third elastic reset member and drive the second locking member to abut against an inner wall of the second hole structure to limit the relative movement between the second structural assembly and the second body; when the second unlocking button is pressed, the second locking member being configured to move relative to the third shaft in a direction away from the inner wall of the second hole structure under the action of the fourth elastic reset member to release the restriction on the relative movement between the second structural assembly and the second body.

15. The electronic device of claim 4, further comprising:

a support structure connected to the first shaft, the support structure being used to place the electronic device on a target bearing surface, the support structure being able to switch to different device forms in its supporting direction to adjust a distance of the first shaft relative to the target bearing surface.

16. The electronic device of claim 4, wherein:

the first body and the second body respectively include a first edge surface and a second edge surface disposed adjacent to each other.

17. The electronic device of claim 15, wherein the device forms include at least one of:

the first edge surface of the first body and the second body being arranged opposite to each other and in contact;

the two second edge surfaces of the first body and the second body being arranged opposite to each other and in contact;

the first edge surface of the first body being arranged opposite to and in contact with the second edge surface of the second body;

the second edge surface of the first body being arranged opposite to and in contact with the first edge surface of the second body;

the first side of the first body being arranged opposite to the second side of the second body; or the first side of the first body being arranged opposite to the first edge surface or the second edge surface of the second body.

18. An electronic device comprising:

a first body;

a second body; and a connecting assembly, the connecting assembly including a first structural assembly movably connected to the first body and a second structural assembly movably connected to the second body, wherein:

the electronic device is configured to switch to different device forms through a first relative movement between the first body and the first structural assembly and/or a second relative movement between the second body and the second structural assembly, in different device forms, a relative position between the first structural assembly and the second structural assembly is different or same, and the first structural assembly includes a first clamping structure, the first clamping structure being disposed on a first side of the first body where no target functional member is disposed, and being configured to move relative to the first body through a first guide structure disposed on the first side of the first body to realize relative movement between the first body and the first structural assembly, the first clamping structure being configured to adjust friction between the first structural assembly and the first body.

* * * * *